March 7, 1972  R. HOCH  3,647,892
PREPARATION OF ETHYLENE GLYCOL
Filed April 28, 1969  2 Sheets-Sheet 1

INVENTOR
ROBERT HOCH
BY
ATTORNEY

March 7, 1972  R. HOCH  3,647,892
PREPARATION OF ETHYLENE GLYCOL
Filed April 28, 1969  2 Sheets-Sheet 2

INVENTOR
ROBERT HOCH
BY
ATTORNEY

United States Patent Office 3,647,892
Patented Mar. 7, 1972

3,647,892
PREPARATION OF ETHYLENE GLYCOL
Robert Hoch, New York, N.Y., assignor to
Halcon International, Inc.
Filed Apr. 28, 1969, Ser. No. 819,776
Int. Cl. C07c *31/20;* C08g *17/06*
U.S. Cl. 260—635 R                                6 Claims

ABSTRACT OF THE DISCLOSURE

This invention relates to a process for the preparation of ethylene glycol by the hydrolysis of a lower carboxylic acid ester of ethylene glycol which has significant advantages over those processes heretofore known. This process involves the introduction of the ester to a hydrolysis zone having at least two hydrolysis equilibration stages. Also added to the hydrolysis zone is $H_2O$. Within the zone, the ester is counter-currently contacted with steam in order to effect the hydrolysis and to produce a vapor mixture of carboxylic acid and water as well as liquid ethylene glycol, both the vapor mixture and the ethylene glycol being withdrawn from the zone.

BACKGROUND OF THE INVENTION

Figure 1:
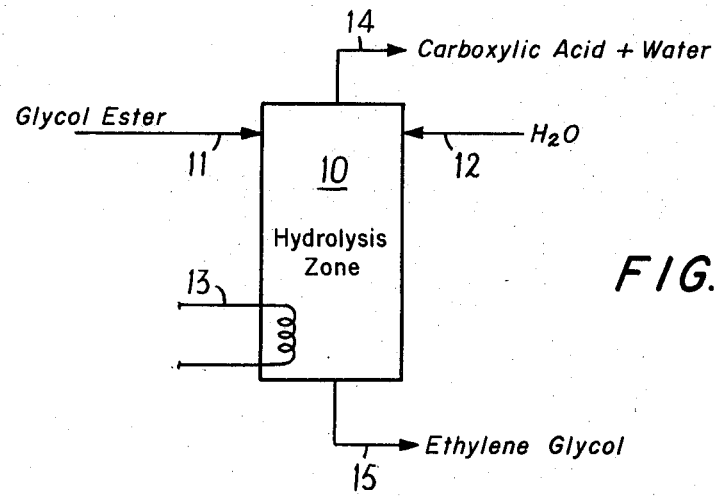

Ethylene glycol is a chemical of enormous commercial importance finding wide utilization not only in the manufacture of anti-freeze compositions but also in the manufacture of polyester fibers. For such applications, stringent purity specifications are required and are quite difficult to meet in commercial processes.

To date, ethylene glycol manufacturing processes of commercial interest have been based upon ethylene oxide as a starting material. Recently, however, a new process has been proposed which is capable of producing ethylene glycol without the necessity for intermediate manufacture of ethylene oxide. This newly developed process employs the liquid phase reaction of ethylene, a carboxylic acid and molecular oxygen in the presence of a catalyst to produce a carboxylic acid ester of ethylene glycol. Ethylene glycol itself is liberated by hydrolysis of the ester. The catalyst for the liquid phase reaction to produce the ester is a halogen employed in conjunction with a variable valence metal cation. The halogen is selected from the group consisting of bromine, chlorine, a bromine-containing compound and a chlorine-containing compound while the metal cation is selected from the group consisting of tellurium, cerium, antimony, manganese, vanadium, gallium, arsenic, cobalt, copper, selenium, chromium or silver. Further details of this process are to be found in copending application, Ser. No. 763,001 filed Sept. 26, 1968.

It is clear that the economic attractiveness of the glycol ester route to ethylene glycol depends upon several factors. Foremost among these factors is the economic recovery of the carboxylic acid so that it can be recycled for preparation of additional glycol ester. Such acid recovery is facilitated by procedures which provide the acid feed to the recovery in the highest concentration so that only a minimum of water need be removed therefrom prior to acid recycle. A second factor dictates that the highest possible conversion of the ester to the glycol be obtained to minimize or avoid the need for recovery and recycle of glycol ester such recovery being even further complicated by the fact that ethylene glycol and its esters are frequently difficult to separate by conventional distillation techniques. A third factor relates to the necessity for recovering the ethylene glycol in high purity suitable, for example, for the manufacture of anti-freeze compositions or of polyester fibers.

However, the hydrolysis is an equilibrium reaction; hence, to obtain high ester conversion would conventionally dictate the use of very large excesses of water, sharply reducing the concentration of acid feed to recovery. Alternatively, to recover acid in high concentration would mandate lower ester conversion to glycol with the attendant disadvantages pointed out above.

The process of this invention provides a means for the hydrolysis of ethylene glycol esters and permits the obtaining of high conversions of ester to ethylene glycol with recovery of the acid component of the ester in relatively high concentration.

SUMMARY OF THE INVENTION

This invention provides a means for making ethylene glycol by hydrolysis of a lower carboxylic acid ester of ethylene glycol. The hydrolysis reaction with which this invention is concerned is exemplified by the following chemical equation but is not limited solely to the diester starting material (ethylene glycol diacetate) shown:

$$C_2H_4(OOCCH_3)_2 + 2H_2O \rightarrow$$
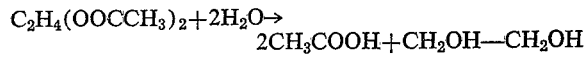
$$2CH_3COOH + CH_2OH\!-\!CH_2OH$$

The hydrolysis processes of this invention comprise the steps of (a) introducing the ester to a hydrolysis zone having at least two hydrolysis equilibration stages (b) introducing $H_2O$ to said zone, (c) counter-currently contacting said ester with steam within said zone, (d) withdrawing from said zone a vapor mixture of carboxylic acid and water, and, (e) withdrawing ethylene glycol from said zone. Of course, the point of withdrawal of the carboxylic acid and the point of withdrawal of the ethylene glycol are at opposite ends of the hydrolysis zone.

As used in this specification and in the appended claims, the following terms have the following meanings:

A "lower carboxylic acid ester of ethylene glycol" (often referred to herein simply as the "glycol ester" for convenience) refers primarily to the diester of the ethylene glycol with a lower carboxylic acid but also encompasses a mixture consisting essentially of the diester in predominant amount together with a lesser amount of a monoester of ethylene glycol with a lower carboxylic acid. Aside from the mono- and diesters, small amounts of by-products associated with the diester preparation process can also be present. Such by-products would normally include small quantities of ethylene glycol itself, water and acids, including unreacted lower carboxylic acid starting material; and might also include catalyst residues and aldehydric by-products, such as, for example, acetaldehyde and formaldehyde. Thus, in the process of this invention, the effluent from the reaction wherein the diester is prepared (this typically being the process above referred to and more completely described in copending application Ser. No. 763,001) can be processed as such in the hydrolysis reaction of this invention; however, it would normally be preferable to purify such an effluent to remove materials having boiling points less than that of the monoester and greater than that of the diester prior to subjecting the glycol ester to the hydrolysis of this invention. This process, however, is applicable to glycol diesters produced in any manner.

The phrase "lower carboxylic acid" as herein used, refers to a mono-basic aliphatic carboxylic acid having from 2 to 6 carbon atoms per molecule and thus the acid moiety of the mono- or diester would likewise have from 2 to 6 carbon atoms. Mixtures of such carboxylic acids and/or carboxylic acid moieties are also encompassed by this phrase. Such acids include acetic acid, propionic acid, butyric acid, isobutyric acid, the valeric and the caproic acids.

Accordingly, the lower carboxylic acid esters of ethylene glycol to which the process of this invention is applicable include ethylene glycol diacetate, ethylene glycol dipropionate, ethylene glycol dibutyrate, ethylene glycol diisobutyrate, the ethylene glycol divalerates and the ethylene glycol dicaproates. Ethylene glycol diacetate, dipropionate, dibutyrate and diisobutyrate are especially desirable feedstocks and the diacetate is the preferred feedstock since acetic acid, needed to form the ester, is readily available at low cost. Of course, mixed esters such as ethylene glycol acetate propionate also can be employed and feedstocks containing some monoester also can be used.

The phrase "hydrolysis equilibration stage" refers to a region within the hydrolysis zone to which a water-containing vapor of a first composition and an ester-containing liquid of second composition flowing countercurrently to each other are introduced, said water-containing vapor and said ester-containing liquid not being in equilibrium with one another at the conditions of the region and from which are withdrawn liquid and vapor streams the composition of which approach chemical equilibrium with one another at the conditions of the region. The chemical equilibrium referred to of course, is the hydrolysis equilibrium and not the vapor-liquid equilibrium. The phrase "approach chemical equilibrium" is used in its technical sense. Since the hydrolysis is an equilibrium reaction, actual attainment of hydrolysis equilibrium at any hydrolysis equilibration stage would require an infinite time which is a manifest absurdity. Hence, this phrase is meant to indicate so close an approach to the equilibrium concentrations as to be indistinguishable therefrom when using ordinarily available analytical techniques.

As hereinabove indicated, the hydrolysis zone employed in this invention contains at least 2 hydrolysis equilibration stages; however, it is generally desired to employ hydrolysis zones having at least 3 such stages and preferably at least 5 such stages. From a process standpoint, increasing the number of such stages above the minima set forth in the preceding sentence is advantageous although not essential. Such an increase permits some reduction in the amount of $H_2O$ needed but, of course, results in an increase in cost of the hydrolysis zone equipment. No process factors exist to set an upper limit on the number of hydrolysis equilibration stages that can be employed in the process of this invention. However, economic factors normally limit this process to a maximum of 100 such stages, desirably 80 stages and preferably 50 stages. Maximum number of such stages is further discussed in the next paragraph.

The form of the hydrolysis zone itself is not of significance to the conduct of the hydrolysis of this invention. Thus the hydrolysis zone may be a tower containing a plurality of vapor-liquid contacting devices such as trays (bubble-cap type, sieve type, valve type, etc.) packing (Raschig rings, glass beads, saddles, etc.), a series of separate reactors, a multiple effect evaporator or the like. When employing a tower as the hydrolysis zone, the use of many more hydrolysis equilibration stages is economically desirable than is the case when separate reactors or evaporators are used. Thus in tower hydrolysis, even more than 50 stages could readily be used without disadvantage; however, when using separate reactors or multiple effect evaporators, more than 10 stages are seldom economic. The hydrolysis zone can also be a region within a column wherein not only is the hydrolysis carried out but also wherein liberated acid is further concentrated by fractionation and/or ethylene glycol is dried by distillation of water therefrom. Some of the methods whereby the hydrolysis may be conducted are depicted in the several figures of the drawing and will be hereinafter more fully described.

The water necessary for the conduct of the hydrolysis can be introduced as such or in the form of steam. If introduced as liquid water, it is then necessary to supply heat to the system to generate the steam required for the process, in situ. Of course, combinations of liquid water feed and steam injection can also be used with or without additional heat input to the hydrolysis zone.

The stoichiometry of the hydrolysis reaction requires employment of 2 mols of water per mol of glycol ester fed to the hyrolysis zone but it is impractical to operate with so small a water to glycol ester ratio except at the expense of a significantly reduced glycol ester conversion and/or reduction of ethylene glycol purity. Accordingly, this invention contemplates use of at least 2.3 moles of $H_2O$ per mole of glycol ester feed. Desirably, at least 2.5 moles of $H_2O$ per mole of glycol ester are used and preferably the amount of $H_2O$ added is in the range of from about 3 to about 10 moles of water per mole of glycol ester feed. Of course, greater amounts of water can be used, for example up to 20 moles per mole of glycol ester feed but use of such large amounts of water is both unnecessary and economically disadvantageous since it results in lower concentration of recovered acid and/or a more dilute ethylene glycol product. In other words, there is no process-dictated upper limit on the amount of $H_2O$ to be added; the only upper limit is governed by economics. Accordingly, it is desired to use less than 20 moles of $H_2O$ per mole of glycol ester feed and preferably to use less than 10 moles per mole.

When water is added to the hydrolysis zone as liquid, it does not matter at what point in the zone it is introduced, it can as readily be admixed with the feed as introduced at any other point. But, in such a case, the heat input requirement should be satisfied by supplying heat at the region within the zone from which the glycol product is withdrawn. When the water is added as steam, it also should be introduced at the region within the zone from which the glycol product is withdrawn. When both liquid and steam are introduced, the steam should be fed at the region of the zone from which the glycol product is withdrawn and the liquid water can be added anywhere. The amount of heat input needed is sufficient to volatilize the carboxylic acid liberated in the hydrolysis and the water which is withdrawn in vapor admixture with the acid.

In the process of this invention, the $H_2O$ added to the system acts as a necessary reactant for the hydrolysis and the steam (whether generated in situ or added as such) acts to strip liberated carboxylic acid and at least a portion of the excess water from the hydrolysis zone. In this manner, extremely high conversions, e.g., conversions of 90% or higher, of ester to glycol can readily be obtained and surprisingly high acid concentrations (as high as 60–80%) can be obtained in the vapor product. Moreover, glycol products having extremely low acid and ester contents can readily be obtained and such low contents are necessary for acceptable final glycol product quality.

To achieve the foregoing advantages requires certain minimum steam rates although, were sacrifices in ester conversion or glycol purity to be acceptable, lower stream rates than those hereinafter discussed could be employed. Moreover, the steam rates employed depend upon the nature of the acid moiety of the ester. Accordingly, to obtain the advantages referred to in the preceding paragraph, the steam rates should at least be such as to provide a value for the ratio, $V/L$, of at least 0.10 when the acid moiety is a $C_2$ or $C_3$ carboxylate (i.e., the ester feed is an acetate or propionate) or a $V/L$ of at least 0.05 when the acid moiety contains more than 3 carbon atoms (i.e., the glycol ester feed is a butyrate, isobutyrate, valerate or caproate). As used herein, "V" is the number of moles of vapor (primarily steam) fed to the hydrolysis equilibration stage from which the glycol product is withdrawn and "L" is the number of moles of the glycol product (i.e., glycol plus diluents contained therein including especially the water content of the glycol product). Desirably, the amount of steam employed is such as to provide a $V/L$ of at least 0.5 when the acid moiety is a $C_2$ or $C_3$ and at least 0.2 when the acid moiety is $C_4$–$C_6$ and preferably the steam rate is such as to provide a $V/L$ ratio of at least 1.0 when the acid moiety is $C_2$ or $C_3$ and at least 0.8 when the acid moiety is $C_4$–$C_6$. Greater amounts of steam, of course, can be advantageously employed; however, the use of very large amounts of steam is costly. Hence it is generally uneconomic to use amounts of steam greater than that necessary to provide $V/L$ ratios in excess of 20 irrespective of the nature of the acid moiety. Desirably the $V/L$ ratio is less than about 15 and preferably is less than about 10.

Hydrolysis zone temperature can be varied widely, the essential requirements being to maintain all reactants and products fluid and to avoid temperatures so high as to cause product degradation. Accordingly, hydrolysis zone temperatures broadly within the range from only marginally above 0° C. up to 300° C. or even higher can be employed. However, operation at temperatures within the range from about 20° C. to about 200° C. is desired and it is generally preferred to operate at temperatures between about 80° C. and about 160° C.

Hydrolysis zone pressures can be varied over a wide range encompassing both sub-atmospheric and super-atmospheric operations. Pressure, of course, should be such as to facilitate volatilization of the acid and of that portion of the water which is in excess of that necessary for the conduct of the hydrolysis. The pressure, of course, should not be so low that only a negligible amount of water is present in the liquid phase within the hydrolysis zone since the hydrolysis is a liquid phase reaction. It should be borne in mind, however, that the pressure of the hydrolysis zone determines to a large extent the proportion of excess water volatilized and withdrawn in admixture with the carboxylic acid and thus, affects the acid concentration in the vapor; the lower the pressure, the leaner will this vapor be in acid. Conversely, the higher the pressure, the greater the proportion of water feed to the hydrolysis zone that will be withdrawn in admixture with ethylene glycol product. Similarly, and for obvious reasons, pressure is also related to temperature and the lower the pressure, the lower will be the temperature within the hydrolysis zone. Thus, broadly speaking, the pressure of operation of the hydrolysis zone should be between about 1 p.s.i.a. and about 200 p.s.i.a., desirably should be between about 2 p.s.i.a. and about 100 p.s.i.a. and preferably should be between about 5 p.s.i.a. and about 75 p.s.i.a. If desired, higher pressures can be used, even up to several thousand p.s.i.a. so long as the partial pressures of water and of the carboxylic acid are maintained at a level such that the total of their partial pressure is within the foregoing ranges. Operation at such high pressures at low temperatures is readily facilitated by the injection of suitable non-reactive gases to the hydrolysis zone to supplement the stripping action of the steam. Such gases should be relatively non-condensable under the conditions employed with the hydrolysis zone to minimize or obviate purification problems that the use of such gases might otherwise introduce. Examples of suitable stripping gases include nitrogen, the so-called inert gases, (helium, neon, argon etc.) carbon dioxide and light hydrocarbons such as methane, ethane, and ethylene.

Residence time of reactants and products within each of the hydrolysis equilibration stages and within the hydrolysis zone as a whole is in no way critical to the conduct of the process of this invention, any practically obtainable residence times being suitable. Thus, for example, residence times from as low as 1 to 2 seconds per stage up to and including several hours per stage or longer are entirely feasible and do not affect product distribution or quality to any significant extent.

The reaction of this invention does not require the presence of a catalyst although, if desired, catalysts can be employed. Any conventional hydrolysis-esterification catalyst can be used, e.g., acids, bases, metal ions, and metal-ligand combinations. The preferred catalysts are those acids which in dilute water solutions (0.1 N) at 25° C. display pH's less than about 3. Such acids include the mineral acids such as hydrochloric, sulfuric and phosphoric acids and also include organic acids such as oxalic, tartaric and malic acids as well as such materials as trichloroacetic acid and the aryl sulfonic acids, e.g., p-toluene sulfonic acid. Sulfuric and phosphoric acids are particularly advantageous because of their stability, their non-volatility, their ready availability and their low cost. When used, such catalysts are employed in quite small amounts, quantities of as little as 0.0001 mole per mole of glycol ester feed being suitable. Larger proportions, for example, up to .1 mole of acid per mole of glycol ester feed can be employed though there is little if any reason to employ amounts greater than 0.01 mole of acid per mole of glycol ester feed and excessive catalyst quantities can adversely affect glycol quality.

DRAWING

The process of this invention will be more fully described in conjunction with the attached drawing which consists of five figures. Each figure is a schematic representation of equipment which, in toto, depicts a form of hydrolysis zone suitable for the practice of this invention.

Referring to FIG. 1, there is provided a tower, 10, having disposed therewithin a plurality of means for effecting vapor-liquid contact sufficient to provide at least 2 hydrolysis equilibration stages. Such means include conventional tray-type devices such as, for example, bubble cap trays, sieve trays, valve trays, baffle trays and the like and also include conventional packings such as Raschig rings, saddles, non-porous beads or any other of the similar materials known to those skilled in the art. Glycol ester feed is introduced to an upper portion of hydrolysis zone 10 via conduit 11. Also introduced to the hydrolysis zone is water, in this instance, in the form of a liquid which is introduced to an upper portion of hydrolysis zone 10 via conduit 12. Heat is supplied to the hydrolysis zone by means of heating coils 13 located at the base of the hydrolysis zone. The heat input to the hydrolysis zone acts to generate steam in situ and thereby to strip carboxylic acid as it is liberated from the glycol ester by hydrolysis thereof. Carboxylic acid and water vapor admixture are withdrawn from the top of hydrolysis zone 10 via conduit 14. This vapor mixture can be subjected to conventional processing (e.g., fractional distillation) to recover highly concentrated carboxylic acid for use in any desired manner. Ethylene glycol product together with unvolatilized water is withdrawn from the base of hydrolysis zone 10 via conduit 15 and can be used as such or subjected to further processing as, for example, for removal of traces of acid (both catalyst residues if catalyst is employed and unstripped carboxylic acid).

Figure 2:
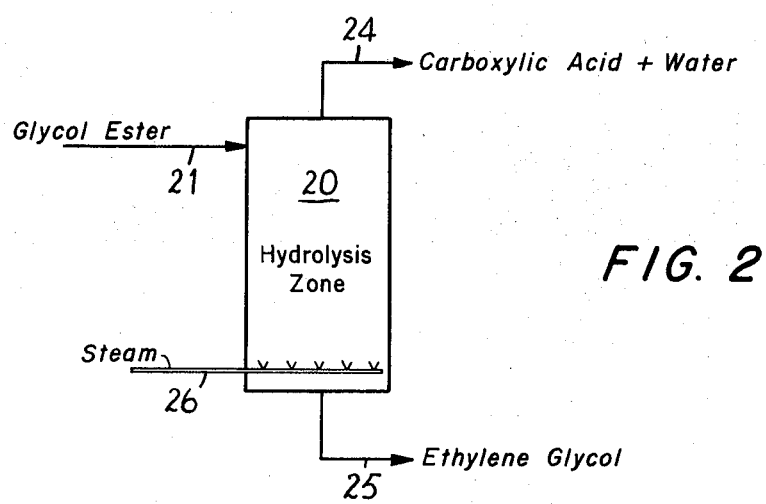

The embodiment of FIG. 2 also employs a hydrolysis zone, 20, which is identical in type to that described in conjunction with FIG. 1. Glycol ester feed is introduced to an upper portion of hydrolysis zone 20 through conduit 21. Vaporized carboxylic acid and water are withdrawn from the top of hydrolysis zone 20 via conduit 24 and ethylene glycol product is withdrawn from the base of hydrolysis zone 20 via conduit 25. In this embodiment, however, liquid-water introduction is not employed nor are heating coils. Instead, water and heat input requirements both are met by injection of open steam to the base of hydrolysis zone 20 via conduit 26. The steam passes upwardly through the hydrolysis zone counter-current to down-flowing glycol ester and ethylene glycol. Liquid water necessary to react with the ester and thereby to liberate glycol and carboxylic acid is obtained by partial condensation of the steam. It will be apparent to those skilled in the art that the embodiments of FIGS. 1 and 2 can be combined. Thus, steam injection can be employed in the embodiment of FIG. 1 in addition to or instead of the provision of heat by means of the heating coils.

Figure 3:
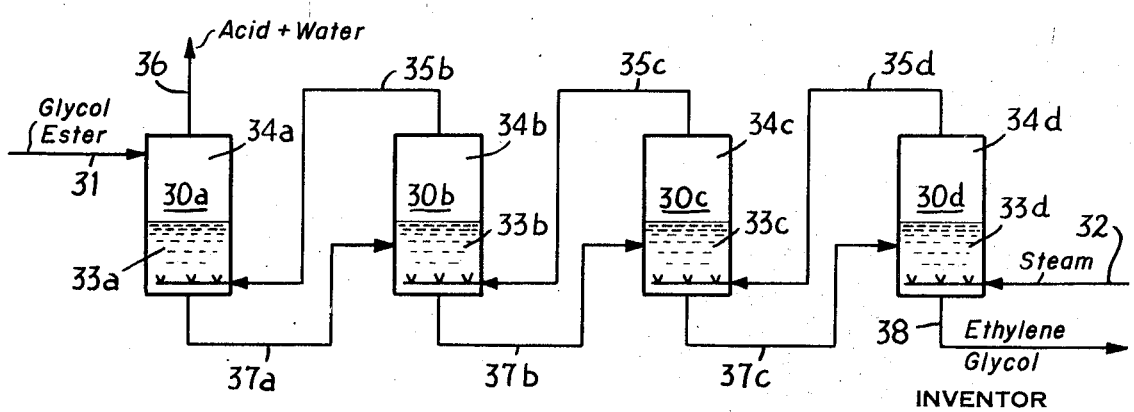

FIG. 3 represents another embodiment of this invention wherein a plurality of separate reactors (30a, b, c and d) are employed as the hydrolysis zone instead of the tower of FIGS. 1 and 2. As depicted, each of the reactors 30a, b, c and d represents a single hydrolysis equilibration stage but, were vapor-liquid contacting means to be added to each of the reactors, each reactor could then function as several hydrolysis equilibration stages. Glycol ester is fed to the first equilibration stage, 30a, via conduit 31. Steam is introduced to the last equilibration stage, 30d, via conduit 32. Disposed within each of the equilibration stages is a liquid phase 33 and a vapor phase 34. The steam added to the last equilibration stage generates vapors containing primarily carboxylic acid and water which are withdrawn from the last reactor via conduit 35d and are passed to the preceding equilibration stage, 30c. This vapor is, of course injected directly into the liquid phase (33c) therewithin and functions to supply heat thereto and to further strip carboxylic acid and water from the liquid phase, 33c. Similarly, the vapor phase from equilibration stage 30c is passed similarly to stage 30b and from 30b to 30a via conduits 35c and b respectively. The carboxylic acid and water product of the hydrolysis are withdrawn from the first equilibration stage, 30a, as a vapor via conduit 36 for further treatment, if desired, in a manner analogous to that described for FIG. 1.

Glycol ester partially hydrolyzed to glycol within equilibration stage 30a is withdrawn from the liquid phase 33a and transferred to the second equilibration stage 30b where it undergoes further hydrolysis of ester to glycol and thence in similar manner is transferred to equilibration stages 30c and 30d. Product ethylene glycol is withdrawn from the last of the equilibration stages 30d, via conduit 38, and also can be further processed, if desired, in a manner analogous to that described in conjunction with FIG. 1. By appropriate arrangement of equipment, the embodiment of FIG. 3 can be constructed in such manner that all transfer of materials between equilibration stages can be accomplished by means of pressure gradients and without the need for fluid transfer devices. Alternatively, appropriate fluid transfer devices (pumps and compressors) can be employed to effect the transfer of liquid and vapor from one equilibration stage to another though such devices are not depicted in the drawing.

Figure 4:
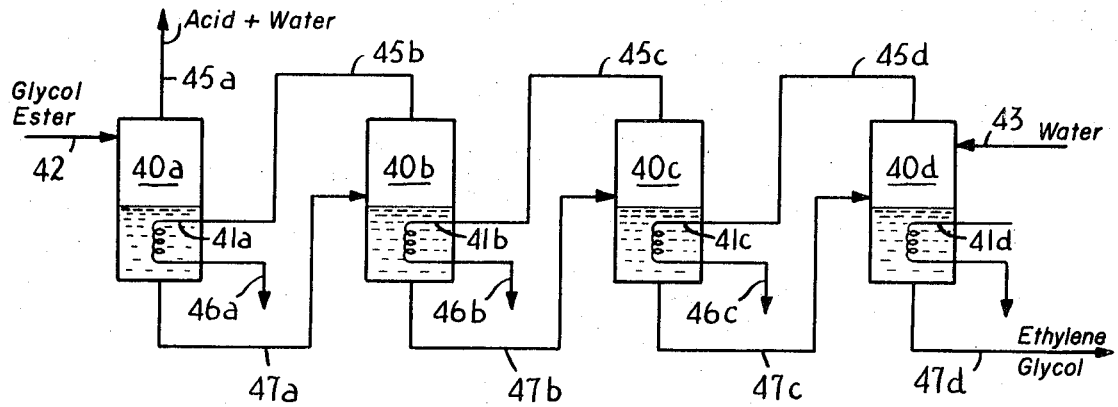

FIG. 4 represents a hydrolysis zone configuration quite similar to that of FIG. 3 but arranged in the form of a quadruple effect evaporator. It will, of course, be understood that fewer or greater numbers of evaporator stages can be employed and it will also be understood that each effect of the evaporator represents a hydrolysis equilibration stage in the same manner as each reactor of FIG. 3 represents such a stage. The embodiment of FIG. 4 employs four reactors (40a, b, c and d). Each reactor is provided with heating coils (41a, b, c and d) as well as vapor draw-off lines 45a, b, c and d and liquid withdrawal lines 47a, b, c and d. Glycol ester is fed to the first effect via conduit 42. Water is added to the last effect as a liquid via conduit 43. Net heat input to the system is provided via heating coil 41d which volatilizes the water added to the last reactor and generates the steam required for the conduct of the process of this invention. The vapors generated within reactor 40d are withdrawn via conduit 45d which communicates directly with heating coils 41c in the preceding reactor 40c. The vapors withdrawn from reactor 40d are condensed therein and, by such condensation, liberate heat and generate further vapors which are, in like manner, utilized in preceding reactors. Liquid, containing glycol ester and ethylene glycol, flows from reactor to reactor via conduits 47a, b and c in the manner described in conjunction with FIG. 3. The condensate formed in heating coils 41a, b and c contains carboxylic acid and water. These condensates are withdrawn from the system via conduits 46a, b, and c and can be combined and processed to recover the acid therefrom in known manner or they can be treated separately, or one or more of the condensates can be discarded. Product acid-water vapor mixture is withdrawn from the first reactor, 40a, via conduit 45a and likewise can be processed in known manner. Product ethylene glycol is withdrawn from the last stage, 40d, via conduit 47d.

Figure 5:
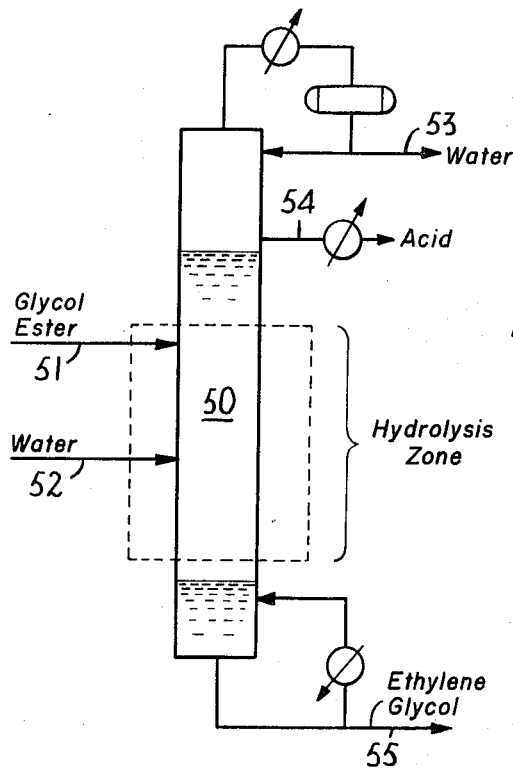

FIG. 5 exemplifies an embodiment of this invention wherein the hydrolysis zone is a portion of a distillation column wherein an overall fractionation is conducted. The hydrolysis zone portion of the distillation column is included within the dashed line. This embodiment employs a distillation column, 50, containing a plurality of vapor-liquid contacting devices. Glycol ester is introduced to this fractionating column via conduit 51. Water is introduced to the fractionating column via conduit 52. It will be noted that, although water is depicted as entering the column at a lower point than the glycol ester this is by no means necessary. Both materials can be introduced at the same point as an admixture or water can be introduced at a higher point at the column. The column is also equipped with conventional reflux and reboiling systems which, being conventional, are not further discussed. Within the hydrolysis zone, the reaction of this invention occurs in the manner heretofore described in conjunction with embodiments of FIGS. 1 and 2. That portion of the column below the hydrolysis zone, however, acts to valatilize water from the ethylene glycol product by conventional fractionation techniques and the water vapor driven off from the glycol by this procedure is the source of the steam necessary for the conduct of the process of this invention. That portion of the column above the hydrolysis zone acts to separate the carboxylic acid from water. Water, being more volatile than the acid, is withdrawn from the top of the fractionating column via conduit 53 and can be discarded or recycled in part to form the water necessarily added to the system via conduit 52. Water is the refluxing agent to the column. At a point intermediate between the column overhead and the hydrolysis zone of the column, the acid concentration in the liquid phase builds up to a high level (60–90% or more) and the acid liberated by the hydrolysis can readily be withdrawn as a liquid sidestream, via conduit 54. The acid thus withdrawn is cooled, and can be used as desired. The bottoms product of the column, withdrawn via conduit 55 is, of course, relatively water-free ethylene glycol. In this embodiment, sub-atmospheric operation (or employment of an inert gas) is, practically speaking, necessary to be able to adequately separate between acid and water and to remove water from ethylene glycol without subjecting the glycol to excessive temperatures when all vapor-liquid contacting devices are in a single vessel. To facilitate such operation at more elevated pressures and/or without use of inert gas, the vapor-liquid contacting devices necessary can be provided within two or more tower shells.

EXAMPLES

The following examples are presented to further illustrate this invention but are not intended as limiting the scope thereof. Unless otherwise indicated, all parts and percents referred to in the following examples are on a molar basis. The following examples all presuppose continuous operations, but this invention is not so limited.

EXAMPLE I

Apparatus similar to that depicted in FIG. 1 is employed. The hydrolysis zone (here in the form of a tower) contains 8 hydrolysis equilibration stages. The tower is constructed of carbon steel, lined with an impervious rubber (polychloroprene) membrane, the rubber membrane being protected by an acid brick lining. The equilibration staging is provided by packing the tower with Raschig rings of an inert ceramic material. Other materials of construction can also be used, e.g., polytetrafluoroethylene lined equipment, titanium, tantalum or zirconium lined equipment or even stainless steels provided that temperature is maintained below about 120° C.

To a point in the tower above the packing is fed 1.0 part per hour of ethylene glycol diacetate and 4.96 parts per hour of water (liquid at 100° C.). Heat is provided at the bottom of the column to generate steam in situ in an amount sufficient to generate a $V/L$ (as heretofore defined) of 1.30. Pressure in the tower is maintained at 16.7 p.s.i.a. and bottoms temperature is 130° C. while overhead temperature is 107° C. From the overhead of the tower are withdrawn 4.3 parts per hour of a vapor mixture of acetic acid and water containing 74–75 wt. percent acetic acid. From the bottoms are withdrawn 1.667 parts per hour of a stream containing approximately 60% of ethylene glycol and 40% water. This bottoms stream contains less than 0.1% of unconverted glycol acetate feed (indicating a conversion exceeding 99.9%) and less than ⅓ % of acetic acid.

When Example I is repeated employing ethylene glycol dipropionate with $V/L=1.5$, ethylene glycol dibutyrate with $V/L=2.1$ and ethylene glycol di-n-caproate with $V/L=6.0$, similar results are obtained.

For comparison, the same amount of water and ethylene glycol diacetate are charged to a stirred reactor at the same temperature and pressure conditions (i.e., 130° C., 16.7 p.s.i.a.). Ester conversion is below 70% and recovered acetic acid has a concentration well below 60 wt. percent. The advantages of this invention are thus clearly seen.

EXAMPLE II

Example I is repeated except that the tower is not equipped with heating coils. Instead, heat is provided by direct injection of 2.32 parts per hour of steam to the base of the tower and water rate to the top of the tower is reduced to 2.64 parts per hour. Thus, this example represents an operation intermediate between the embodiments illustrated in FIGS. 1 and 2. Substantially identical results are obtained.

EXAMPLES III–V

Example I is repeated employing tower reactors of differing numbers of hydrolysis equilibration stages. In each run, 1.0 part per hour of ethylene glycol diacetate feed is employed. Table I below summarizes operating conditions and results obtained. In each of these examples conversion of the ester to glycol is above 99% and selectivity (i.e., moles glycol formed per mol of ester reacting) is also greater than 99%.

TABLE I

| Example number | III | IV | V |
|---|---|---|---|
| Number of stages [1] | 21 | 13 | 7 |
| Water added, parts/hr | 3.64 | 3.88 | 6.17 |
| $V/L$ (generated by heat input) | 0.11 | 1.03 | 1.50 |
| Pressure, p.s.i.a | 1.74 | 9.9 | 80.1 |
| Temp., ° C. (at bottom of hydrolysis zone) | 100 | 150 | 175 |
| Overhead vapor: | | | |
| Parts/hr | 3.53 | 3.78 | 4.67 |
| Acid content, wt. percent | 81.5 | 79.0 | 71.4 |
| Ethylene glycol product: | | | |
| Parts/hr | 1.11 | 1.11 | 2.50 |
| Concentration, wt. percent glycol | 96.9 | 96.9 | 69.7 |

[1] Reference is to number of hydrolysis equilibration stages within the hydrolysis zone.

EXAMPLE VI

Apparatus similar to that depicted in FIG. 3 is employed except that five reactors are used instead of the four shown in the drawing. Ethylene glycol diacetate is fed to the first reactor at a rate of 1.0 part per hour. Water at the rate of 7.12 parts per hour is fed to the fifth (last) reactor and heat is supplied thereto to generate a $V/L$ of 1.25. Table II below summarizes the temperature conditions within each reactor (i.e., at each hydrolysis equilibration stage), the conversion (i.e., moles of ester reacting per mole of ester fed to the overall system expressed cumulatively) obtained therewithin and the overall results obtained. Vapor and liquid are transferred from reactor to reactor by means of pumps and compressors and pressure within each reactor is approximately 6.1 p.s.i.a. Selectivity within each reactor, and overall, is greater than 99%.

TABLE II

| Stage No. | Stage temp., ° C. | Conversion, percent | Acid product, pts./hr. | Glycol product, pts./hr. |
|---|---|---|---|---|
| 1 | 160 | 50 | [1] 6.46 | |
| 2 | 130 | 83 | | |
| 3 | 115 | 98.3 | | |
| 4 | 105 | 99.98 | | |
| 5 | 100 | >99.99 | | [2] 1.66 |

[1] 60.0 wt. percent.
[2] 84 wt. percent.

The foregoing description illustrates the methods of this invention whereby the advantages thereof are obtained. It will be understood that modifications and variations thereof may be effected by those skilled in the art without departing from the spirit of this invention. Accordingly, it is intended that all matter contained in the foregoing description shall be interpreted as illustrative and not in a limiting sense.

What is claimed is:

1. A process for the preparation of ethylene glycol by hydrolysis of a lower carboxylic acid ester of ethylene glycol, the carboxylate moiety of the ester having from 2 to 6 carbon atoms which process comprises the steps of:
  (a) introducing the ester to a hydrolysis zone having at least 2 hydrolysis equilibration stages;
  (b) introducing liquid $H_2O$ to said zone, the amount being at least 2.3 mols per mol of ester introduced to said zone;
  (c) within said zone, counter-currently contacting at a temperature between about 80° C. and about 160° C. said ester with said liquid $H_2O$ and with additional $H_2O$ as steam, the amount of said steam being sufficient to provide a $V/L$ ratio of at least 0.1 when the carboxylate moiety has two or three carbon atoms and 0.05 when the carboxylate moiety has more than three carbon atoms, V being the number of mols of steam supplied to the hydrolysis equilibration stage from whence the ethylene glycol product is withdrawn and L being the number of mols of ethylene glycol product withdrawn;
  (d) withdrawing from the upper portion of said zone a vapor mixture of carboxylic acid and water; and,
  (e) withdrawing liquid ethylene glycol product from the lower portion of said zone.

2. A process in accordance with claim 1 wherein the lower carboxylic acid ester of ethylene glycol is selected from the group consisting of the acetates, propionates and butyrates of ethylene glycol.

3. A process in accordance with claim 1 wherein the lower carboxylic acid ester of ethylene glycol is predominantly ethylene glycol diacetate.

4. A process in accordance with claim 1 wherein the steam is generated in situ.

5. A process in accordance with claim 1 wherein said steam is introduced to the hydrolysis equilibration stage of said zone from whence the ethylene glycol product is withdrawn.

6. A process in accordance with claim 1 wherein the hydrolysis zone is in the form of a tower containing a plurality of vapor-liquid contacting devices, the glycol ester being fed to an upper portion thereof, ethylene glycol product being withdrawn from the bottom thereof, and the carboxylic acid-water mixture being withdrawn from the top thereof.

References Cited
UNITED STATES PATENTS

| | | | |
|---|---|---|---|
| 75,929 | 3/1868 | Laist | 203—95 |
| 2,164,851 | 7/1939 | Yabroff et al. | 260—607 |
| 2,221,799 | 11/1940 | Ittner | 260—415 |
| 2,267,750 | 12/1941 | Robisch | 260—415 |
| 2,702,784 | 2/1955 | Rossi | 203—96 |
| 2,804,427 | 8/1957 | Suriano | 203—96 |
| 2,971,989 | 2/1961 | Lapporte et al. | 260—635 R |
| 3,239,572 | 3/1966 | Zinsstag | 260—639 R |
| 3,317,593 | 5/1967 | Enk et al. | 260—541 |

OTHER REFERENCES

Horsley (I), "Azeotropic Data," 1952, pages 6, 7 and 8, Q0518D6.

Horsley (II), "Azeotropic Data–11," 1962, pages 12 and 13, Q0518D6.

Lange, "Handbook" of Chemistry," 1961, pp. 384, 385, 448, 449, 450, 451, 564, 565, 662, 663, 716, 717, TP151H25.

BERNARD HELFIN, Primary Examiner

J. E. EVANS, Assistant Examiner

U.S. Cl. X.R.

260—497 R, 499, 540, 541, 604 R, 637 R